(12) United States Patent
Borenstein et al.

(10) Patent No.: US 10,593,222 B1
(45) Date of Patent: *Mar. 17, 2020

(54) VIDEO FILMING AND DISCOVERY SYSTEM

(71) Applicant: Grokker Inc., San Jose, CA (US)

(72) Inventors: Lorna Borenstein, San Jose, CA (US); Bradley Staples, San Jose, CA (US); Christopher Kirmse, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/807,063

(22) Filed: Nov. 8, 2017

Related U.S. Application Data

(63) Continuation of application No. 14/701,381, filed on Apr. 30, 2015, now Pat. No. 9,842,507.

(60) Provisional application No. 62/018,491, filed on Jun. 27, 2014, provisional application No. 61/987,162, filed on May 1, 2014.

(51) Int. Cl.
*H04N 7/16* (2011.01)
*G09B 5/06* (2006.01)
*H04N 5/262* (2006.01)
*G06K 9/00* (2006.01)

(52) U.S. Cl.
CPC ......... *G09B 5/065* (2013.01); *G06K 9/00751* (2013.01); *G06K 9/00765* (2013.01); *H04N 5/262* (2013.01)

(58) Field of Classification Search
CPC .. H04N 21/84; H04N 21/482; H04N 21/4316; H04N 21/4821; H04N 21/4532; H04N 21/44222; H04N 5/44543; H04N 7/163
See application file for complete search history.

(56) References Cited

U.S. PATENT DOCUMENTS

| | | | | |
|---|---|---|---|---|
| 7,603,682 | B1* | 10/2009 | Akiyama | H04H 20/82 725/139 |
| 7,640,320 | B2* | 12/2009 | Madison | H04L 29/06 707/770 |
| 9,152,680 | B1* | 10/2015 | Milian | G06Q 10/0631 |
| 9,280,799 | B1* | 3/2016 | Milian | G06Q 10/0631 |
| 2005/0108769 | A1* | 5/2005 | Arnold | H04N 21/25866 725/115 |
| 2005/0216942 | A1* | 9/2005 | Barton | H04N 7/17318 725/97 |

(Continued)

*Primary Examiner* — Annan Q Shang
(74) *Attorney, Agent, or Firm* — Burbage Law, P.C.; Jon-Michael Burbage; Elizabeth Ruzich

(57) ABSTRACT

A system and method for filming and discovering videos for users may include receiving an instructional video of an event from a content provider. The instructional video includes portions of a first video stream with images at an eye level of an instructor and portions of a second video stream with close-up shots related to a concept being taught during the event. It is determined whether the instructional video includes a title sequence, an introduction, a lesson, a recap, and a conclusion. If the instructional video fails to contain the title sequence, the introduction, the lesson, the recap, and the conclusion, a rejection of the instructional video is provided that includes an explanation. If the instructional video contains the title sequence, the introduction, the lesson, the recap, and the conclusion, the instructional video is stored in a video database.

20 Claims, 13 Drawing Sheets

(56) References Cited

U.S. PATENT DOCUMENTS

| | | | |
|---|---|---|---|
| 2006/0271959 A1* | 11/2006 | Jacoby | H04N 7/17318 |
| | | | 725/46 |
| 2006/0282856 A1* | 12/2006 | Errico | G06Q 30/02 |
| | | | 725/46 |
| 2008/0092173 A1* | 4/2008 | Shannon | H04N 5/44543 |
| | | | 725/47 |
| 2008/0320159 A1* | 12/2008 | Naimark | H04N 21/2187 |
| | | | 709/231 |
| 2009/0292738 A1* | 11/2009 | Hurwitz | G06Q 99/00 |
| 2010/0031162 A1* | 2/2010 | Wiser | G06Q 30/0255 |
| | | | 715/747 |
| 2010/0205541 A1* | 8/2010 | Rapaport | G06Q 10/10 |
| | | | 715/753 |
| 2011/0078717 A1* | 3/2011 | Drummond | H04N 21/4586 |
| | | | 725/14 |
| 2013/0227612 A1* | 8/2013 | Abboa-Offei | H04N 21/482 |
| | | | 725/46 |
| 2014/0173038 A1* | 6/2014 | Newton | H04L 41/0893 |
| | | | 709/219 |
| 2014/0195675 A1* | 7/2014 | Silver | H04L 65/1083 |
| | | | 709/224 |
| 2015/0020206 A1* | 1/2015 | Matthews | G06F 21/52 |
| | | | 726/26 |
| 2015/0271557 A1* | 9/2015 | Tabe | H04N 21/4788 |
| | | | 725/14 |
| 2015/0312652 A1* | 10/2015 | Baker | H04N 21/8549 |
| | | | 386/281 |
| 2016/0012465 A1* | 1/2016 | Sharp | G06Q 20/18 |
| | | | 705/14.17 |
| 2017/0201779 A1* | 7/2017 | Publicover | H04W 4/21 |

* cited by examiner

300

Group Yoga Classes

This Week's Schedule
classes listed below in three timezones: GMT, EST, PST

Monday, June 30

6 am Beginner Yoga
preview class now:
GMT EST PST 9 am Beginner Yoga
preview class now:
GMT EST PST

Wednesday, June 25

6 am Beginner Yoga
preview class now:
GMT EST PST 9 am Beginner Yoga
preview class now:
GMT EST PST

Friday, June 27

6 am Beginner Yoga
preview class now:
GMT EST PST 9 am Beginner Yoga
preview class now:
GMT EST PST

Figure 3A

VIDEO FILMING AND DISCOVERY SYSTEM

CROSS-REFERENCE TO RELATED APPLICATIONS

This application is a continuation of application Ser. No. 14/701,381, titled "Video Filming and Discovery System," filed Apr. 30, 2015, which claims the benefit of Application No. 61/987,162, filed May 1, 2014, titled "Video Filming and Discovery System" and Application No. 62/018,491, titled "System for Generating a Chat Room Associated with an Instructional Video," filed Jun. 27, 2014, the entirety of each of which is herein incorporated by reference.

FIELD OF THE INVENTION

The specification relates to a system and method for filming videos and discovering videos for users.

BACKGROUND

Internet video services provide many instructional videos. However, there is no guarantee of the quality. Many videos focus on the wrong details or convey complicated details too quickly. As a result, it can be difficult to find helpful videos. Some systems attempt to remedy the problem by providing a ratings system for users to rate the videos. However, users can be inconsistent about their reasons for giving a video a high or low rating.

In addition, even if the quality of the videos was consistent, it can be difficult to identify which videos a user might be interested in. Some systems attempt to remedy the problem by allowing users to share recommendations with each other. If a user is dissatisfied with the recommendations, however, it can result in the user giving up on the video service.

SUMMARY

The specification relates to a system and method for filming and discovering videos for users. In one embodiment, the specification includes a system for recording an instructional video of an event. The system includes a studio having a front area and a back area. The system also includes a plurality of lights including a key light, a fill light, and a back light, the key light and the fill light being located in the front area and positioned in front of an instructor, and the back light being located in the back area and positioned behind the instructor. The system also includes a first recording device that captures a first video stream of wide shots of an event including images at an eye level of an instructor. The first recording device may be a static camera with a 14-35 mm lens. The system includes a second recording device that captures a second video stream of detail shots of the event including close-up shots related to a concept being taught during the event, the second recording device being positioned within 45 degrees of the first recording device. The second recording device may be a camera with a variable zoom between 40-80 mm on a fluid head.

The system may also include an editing device including a memory that stores instructions for editing software and a processor configured to execute the instructions for the editing software by combining portions of the first video stream and portions of the second video stream to form an instructional video and transmitting the instructional video to an upload server, where an editor using the editing software ensures that the instructional video includes a title sequence, an introduction, a lesson, a recap, and a conclusion. The system may also include participants that are positioned on each side of the instructor, wherein the first recording device captures an unobstructed view of the instructor.

In one embodiment, an instructional video of an event is received from a content provider. The instructional video includes portions of a first video stream with images at an eye level of an instructor and portions of a second video stream with close-up shots related to a concept being taught during the event. It is determined whether the instructional video includes a title sequence, an introduction, a lesson, a recap, and a conclusion. If the instructional video fails to contain the title sequence, the introduction, the lesson, the recap, and the conclusion, a rejection of the instructional video is provided that includes an explanation. If the instructional video contains the title sequence, the introduction, the lesson, the recap, and the conclusion, the instructional video is stored in a video database. The instructional video may then become part of a video repository for users to access to learn from the events depicted in the videos. The specification advantageously describes a consistent approach to making videos so that users may best learn from the videos and be able to expect a consistent video format.

The title sequence may last for 5-10 seconds. The introduction may be 20-30 seconds and include a name of the instructor, a subject of the event, and a lesson of the event. The recap may be a summary of what was demonstrated. The conclusion may include a name of the instructor.

The specification also describes a system that includes a video hosting site that provides videos for users to view and a social network component for users to interact with each other and recommend videos to each other. For example, a first profile is generated for a first user, the first profile including topics that the first user is interested in and user consumption. User consumption of a set of videos is logged, including indications of approval, selected videos, and viewed videos associated with the first user.

A connection may be generated between the first user and a second user. A recommendation for a recommended video is received from the second user for the first user. It is determined whether the first user will be interested in the recommended video based on the first profile including user consumption. If it is determined that the first user will not be interested in the recommended video, the recommendation is stored in a repository that is accessible by the first user. Thus, for example, the first user may not be bothered by a notification about the recommendation but the first user may still be able to access the recommended video. If it is determined that the first user will be interested in the recommended video, the first user is notified of the recommendation for the recommended video. The first profile may be updated based on a reaction of the first user to the recommended video. For example, the first profile may be updated by adding a topic of the recommended video as the topic that the user is interested in and updating the user consumption with information about the recommended video. As a result, the specification advantageously describes determining how to provide recommendations to a user that the user is likely to enjoy instead of providing recommendations that the user may not enjoy and that may discourage the user from using the video hosting site.

The specification describes an additional embodiment for providing users with guidance. The video hosting site may register a user including billing information and identify an instructional video from a group of instructional videos for associating with a chat room. For example, only videos in certain categories may be associated with a chat room, such as based on categories of interest associated with active users or historical behavior of active users. A selection of the instructional video may be received from the user. A chat room may be generated for the user to discuss the instructional video a first predetermined amount of time before the instructional video begins. An instructor of the instructional video may be present in the chat room to answer any questions.

The instructional video may be transmitted to the user and the chat room may be provided for the user to discuss the instructional video a second predetermined amount of time after the instructional video ends. The instruction may be present in the chat room to answer any follow-up questions. The second predetermined amount of time may be different from the first predetermined amount of time. For example, the chat room provided before the instructional video may be for five minutes and the chat room provided after the instructional video may be available until the users exit the chat room.

A user profile that includes categories of interest associated with the user may be generated. The categories of interest may be determined based on activities performed by the user, such as watching instructional videos, providing indications of approval, and adding instructional videos to a collection. The categories of interest may be used to determine what types of instructional videos are associated with a chat room.

BRIEF DESCRIPTION OF THE DRAWINGS

FIG. 3A illustrates an example user interface for selecting a group instructional video.

DETAILED DESCRIPTION OF THE PREFERRED EMBODIMENTS

Figure 1:
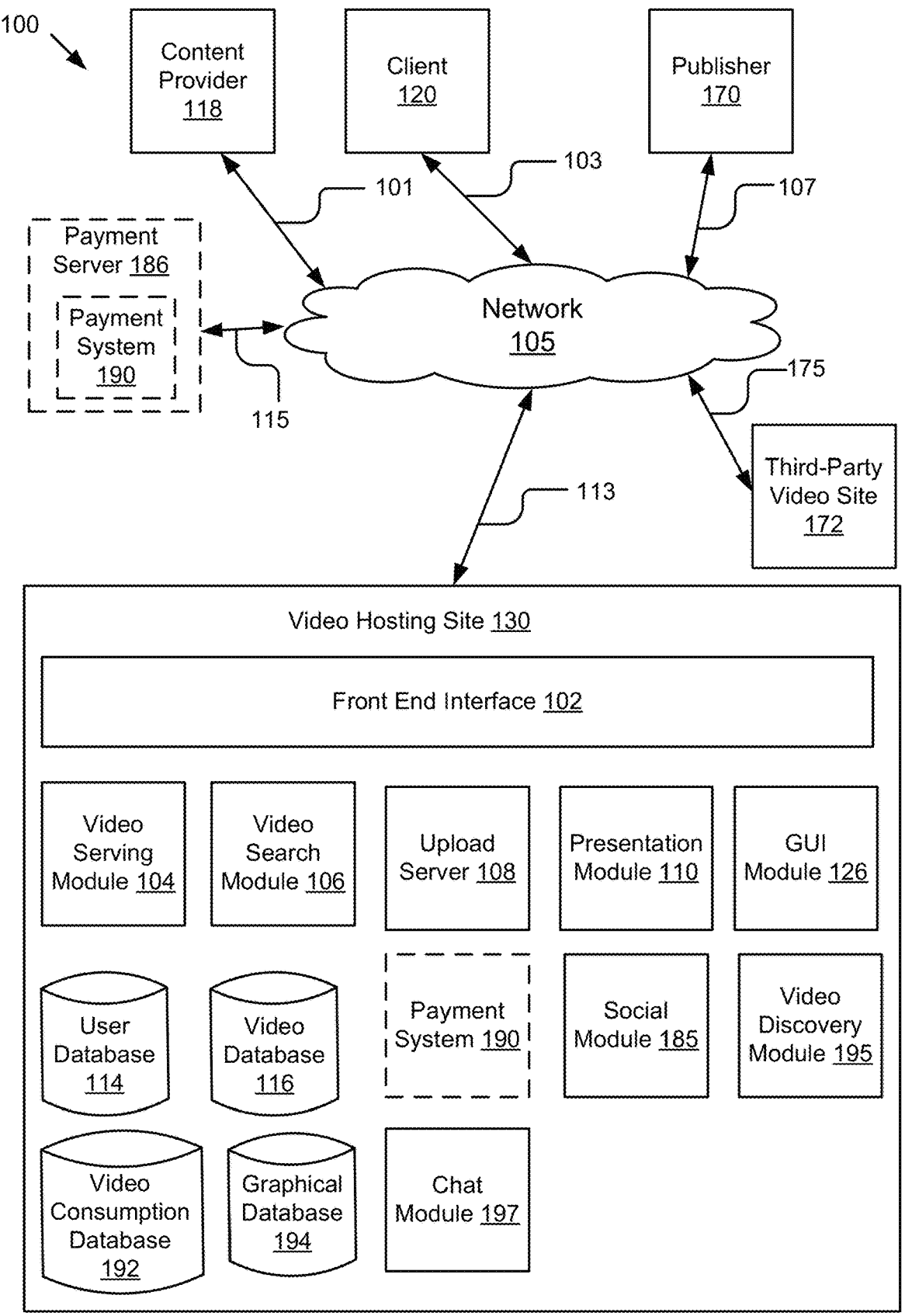
FIG. 1 is a high-level block diagram illustrating a system for discovering videos according to one embodiment.

The illustrated embodiment of the system 100 includes a client 120, a video hosting site 130, a content provider 118, a publisher 170 and a third-party video site 172. Optionally, the system 100 includes a payment server 186. The entities of the system 100 are communicatively coupled to a network 105. Although only one content provider 118, one client 120, one publisher 170, one payment server 186 and one third-party video site 172 are illustrated, any number of content providers 118, clients 120, publishers 170, payment servers 186 and third-party video sites 172 can be connected to the network 105. Furthermore, while only one network 105 is coupled to the client 120, the content provider 118, the publisher 170, the third-party video site 172, the payment server 186 and the video hosting site 130, any number of networks 122 can be connected to these entities shown in FIG. 1.

The network 105 is a conventional type of network, wired or wireless, and may have any number of configurations such as a star configuration, token ring configuration or other configurations. In one embodiment, the network 105 includes one or more of a local area network (LAN), a wide area network (WAN) (e.g., the Internet), and/or any other interconnected data path across which multiple devices communicate. In another embodiment, the network 105 is a peer-to-peer network. The network 105 is coupled to or includes portions of a telecommunications network for sending data in a variety of different communication protocols. For example, the network 105 is a 3G network or a 4G network. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 105 are encrypted using conventional encryption technologies such as secure sockets layer (SSL), secure HTTP and/or virtual private networks (VPNs).

The video hosting site 130 is communicatively coupled to the network 105 via signal line 113. The content provider 118 is communicatively coupled to the network 105 via signal line 101. The client 120 is communicatively coupled to the network 105 via signal line 103. The publisher 170 is communicatively coupled to the network 105 via signal line 107. The third-party video site 172 is communicatively coupled to the network 105 via signal line 175. The payment server 186 is communicatively coupled to the network 105 via signal line 115.

The content provider 118 is any device that provides videos to the video hosting site 130. For example, the content provider 118 is a computing device that uploads a video to the video hosting site 130 via the upload server 108. In one embodiment, the content provider 118 also acts as one or more of the client 120 and the publisher 170. In yet another embodiment, the content provider 118 is the same entity that operates the video hosting site 130.

The content provider 118 may be configured to operate a computing device to perform various content provider 118 functions. Examples of the content provider functions include, but are not limited to: uploading a video to the video hosting site 130; editing a video stored by the video hosting site 130; removing a video from the video hosting site 130; and editing content provider preferences associated with a video.

In one embodiment, the content provider 118 creates instructional videos that follow a specified format. For example, the instructional video may be created from a first video stream and a second video stream of a studio with a front and back area. The studio may include a key light, a fill light, and a back light, the key light and the fill light may be located in the front area and positioned in front of an instructor, and the back light may be located in the back area and positioned behind the instructor. A first recording device captures a first video stream of wide shots of an event including images at an eye level of an instructor. A second recording device captures a second video stream of detail shots of the event including close-up shots related to a concept being taught during the event, the second recording device being positioned within 45 degrees of the first recording device. The concept may include broad subject matter, such as an introduction to yoga or more narrow subject matter, such as how to complete an eight-angle pose in yoga.

The content provider 118 may also use additional equipment including at least one of memory storage that can hold a full-day shoot, camera batteries, an AC adaptor, a tripod with a fluid-head/pan-head or dolly, a wireless or wired microphone system including lavaliere or headworn microphone and transmitters, an audio capture device that is part of the recording devices or separate, editing software that outputs final video specifications, and an editing workstation.

The content provider 118 receives from the first recording device a first video stream of an event including images at eye level of an instructor. The first video stream may be a locked-down, straight-on wide shot where there is basic coverage of the entire lesson and the focus is on the instructor when speaking. The wide shot should include the instructor and at least a part of the studio surroundings. The first recording device that captures the first video stream should generally be at eye level with the instructor to create a sense of connection between the audience and the expert. For example, for a cooking video the first video stream could be of the instructor showing how to make a stew and the second video could be a close up of the instructor showing how to julienne vegetables for the stew.

The content provider 118 may receive from a second recording device a second video stream of detail shots the event including close-up shots related to a concept being taught during the event. The second video stream includes what the straight-on wide shot cannot—subtle body movements, nuanced techniques, etc. The perspective of the close-up shot should generally be within 45 degrees of the locked-down shot.

The content provider 118 may include an editing device with a memory that stores instructions for editing software and a processor configured to execute the instructions for editing software by combining portions of the first video stream and portions of the second video stream to form an instructional video and transmitting the instructional video to an upload server 108, where an editor using the editing software ensures that the instructional video includes a title sequence, an introduction, a lesson, a recap, and a conclusion. The editing software may receive a rejection of the instructional video that includes an explanation from the upload server 108. The editing software may modify the instructional video based on the rejection and transmit a revised instructional video to the upload server 108.

A user of the client device should confirm that the instructional video includes a title sequence, an introduction, a lesson, a recap, and a conclusion. In some embodiments, the title sequence lasts for 5-10 seconds; the introduction is 20-30 seconds and includes the name of the instructor, the subject of the video, and a lesson of the video; the recap is a summary of what was demonstrated; and the conclusion includes the name of the instructor. In some embodiments, the content provider 118 adds a handle at the end of the instructional video before transmitting the video to an upload server 108 at the video hosting site 130.

The client 120 is any processor-based computing device, for example, a personal computer, a personal digital assistant, a television set-up box, a tablet computer, a cell phone (e.g., a smart phone), a portable music player, a portable video game player, and a laptop computer. The client 120 executes client software such as a web browser or a built-in client application and connects to the video hosting site 130 via the network 105. In one embodiment, the client 120 includes a variety of different computing devices.

The client 120 includes a processor (not pictured), a memory (not pictured) and other components conventional to a computing device. In one embodiment, the client 120 is configured as a content provider 118 to provide videos to the video hosting site 130. In another embodiment, the client 120 also acts as the publisher 170. In yet another embodiment, the client 120 is configured to retrieve videos stored by the video hosting site 130. For example, the client 120 includes an embedded video player (e.g., the Flash™ player from Adobe System, Inc.) adapted for the video content formats used in the video hosting site 130 so that a user is able to view a video from the video hosting site 130 using the embedded video player.

The publisher 170 is any entity that publishes a video. In one embodiment, the publisher 170 is any processor-based computing device that publishes a video on a website, an application store, etc. In another embodiment, the publisher 170 refers to a human user that operates a computing device to publish the video without causing any confusion. In one embodiment, the publisher 170 owns one or more rights for a video in a specified territory and is able to issue a license for the right in the territory. For example, the publisher 170 owns a reproduction right for a video in the United States and has the power to issue a license for the reproduction right for the video in the United States. In one embodiment, the publisher 170 can own and issue licenses for any other rights for the video. In yet another embodiment, the publisher 170 owns a portion of a right for a video in a specified territory. For example, the publisher 170 owns 50% of a distribution right of a video in the United States.

A right for a video includes a public performance right, a reproduction right, a distribution right, a synchronization right ("a sync right") and/or a right to make a derivative work. Rights for a video are territory specific. For example, a first entity may own the distribution right for a video in the territory of the United States while, at the same time, a second entity owns the distribution right for the same video in a different territory such as Brazil, India, China, Japan, etc.

The optional payment server 186 is any hardware server device that includes a processor (not pictured) and a memory (not pictured) and has network access capabilities. In one embodiment, the payment server 186 provides payment information to a licensor from which a service provider purchases a license for a right in a territory. For example, the payment server 186 retrieves payment data from the video usage database 192 and sends a payment to a licensor via the network 105.

In one embodiment, the payment server 186 includes a payment system 190. The payment server 186 is also configured to bill users of the video hosting site 130 for using the video services. The payment server 186 may charge all users of the video hosting site 130 or users that have subscribed to a level of premium service. The payment server 186 may bill the users on a monthly or yearly basis, or some other payment plant.

The optional payment system 190 is code and routines, when executed by a processor (not pictured), sends a payment to a licensor. For example, the payment system 190 retrieves the payment data and information about an escrow account from the video consumption database 192 and pays the licensor using an escrow account based on the payment data. The optional payment system 190 also bills users for using the video services. In one embodiment, the payment system 190 is included in the video hosting site 130. In another embodiment, the payment system 190 is included in the payment server 186.

The third-party video site 172 is a third-party entity that provides videos to users. For example, the third-party video site 172 is a third-party video hosting site.

The video hosting site 130 is any system that allows a user to access a video via searching and/or browsing interfaces. It will be understood that the term "web site" represents any computer system adapted to serve content using any internet protocols, and is not intended to be limited to content uploaded or downloaded via the Internet or the HTTP protocol.

In one embodiment, the video hosting site 130 is configured to receive and share all or a portion of a video. In another embodiment, the video hosting site 130 is configured to host a file with any media type and/or file type. For example, the video hosting site 130 shares content such as a video file, an audio file (e.g., one or more songs), a file that includes a combination of video and audio, an image file such as a JPEG or GIF file, a file including a video game program and/or a text file.

In one embodiment, sources of videos provided by the video hosting site 130 are from uploads of videos by users (e.g., instructors that are experts in a particular field or topic), searches or crawls of other web sites or databases of videos, or the like, or any combination thereof. For example, the video hosting site 130 is configured to allow uploads of videos by users. In another example, the video hosting site 130 is configured to obtain videos from other sources by crawling such sources or searching such sources in real time.

In the illustrated embodiment, the video hosting site 130 includes: a front end interface 102; a video serving module 104; a video search module 106; an upload server 108; a presentation module 110; a graphical user interface (GUI) module 126; a user database 114; a video database 116; a video usage database 192; a graphical database 194; a social module 185; a video discovery module 195; and a chat module 197. The components of the video hosting site 130 are communicatively coupled to each other. For example, the components are communicatively coupled to one another via a bus (not pictured). Other conventional features, such as firewalls, load balancers, authentication servers, application servers, failover servers, site management tools, and so forth are not shown so as not to obscure the feature of the system.

In one embodiment, the illustrated components of the video hosting site 130 are implemented as single pieces of software or hardware or as multiple pieces of software or hardware. In general, functions described in one embodiment as being performed by one component, can also be performed by other components in other embodiments, or by a combination of components. Furthermore, functions described in one embodiment as being performed by components of the video hosting site 130 can be performed by clients 120 or other entities in other embodiments if appropriate. In one embodiment, the functionality attributed to a particular component can be performed by different or multiple components operating together.

In one embodiment, each of the various servers and modules is implemented as a server program executing on a server-class computer including one or more central processing units (CPUs), memory, network interface, peripheral interfaces, and other well-known components. The computers themselves preferably run an open-source operating system such as LINUX, have generally high performance CPUs, 1 gigabyte or more of memory, and 100 gigabyte or more of disk storage. In one embodiment, other types of computers are used, and it is expected that as more powerful computers are developed in the future, they are configured in accordance with the teachings disclosed herein. In another embodiment, the functionality implemented by any of the elements is provided from computer program products that are stored in tangible computer accessible storage mediums (e.g., random access memory (RAM), flash, hard disk, optical/magnetic media, or solid-state drive (SSD), etc.).

The front end interface 102 is an interface that handles communication between the video hosting site 130 and one or more of the content provider 118, the client 120, the publisher 170 and the third-party video site 172 via the network 105. For example, the front end interface 102 receives a video uploaded from the content provider 118 and delivers the video to the upload server 108. In one embodiment, the front end interface 102 receives requests from users operating on the client 120 and delivers the requests to other components of the video hosting site 130 (e.g., the video search module 106 or the video serving module 104). For example, the front end interface 102 receives a video search query from a user and sends the video search query to the video search module 106.

The video serving module 104 is code and routines that, when executed by a processor (not pictured), processes requests for a video and provides the video to users. For example, the video serving module 104 receives a video query from a user via the front end interface 102, retrieves a set of videos that match the video query from the video database 116 and presents the set of videos to the user via the front end interface 102.

In one embodiment, the video serving module 104 receives a request from a user to access a video when the user clicks on a link to the video. The request received from the user includes a video identifier (ID) of the video that the user intends to access. The video ID is described below in more detail. In one embodiment, the video ID is included automatically in the request once the user clicks on the link for the video. The video serving module 104 uses the video ID to search and locate the video in the video database 116. Once the requested video is located, the video serving module 104 transmits the video to the user via the front end interface 102. The video is presented to the user on a web page. For example, the video serving module 104 retrieves a video requested by a user from the video database 116 and sends the video data to a client 120 operated by the user, allowing the user to view the video on the client 120. Metadata associated with the video such as a title and a brief description is also presented to the user while the user is viewing the video. In one embodiment, the video serving module 104 stores the video ID of the video in the user database 114 after sending the video to the user so that a video access history (e.g., a video viewing history) of the user is stored in the user database 114 or the video usage database 192.

The video search module 106 is code and routines that, when executed by a processor (not pictured), processes any search queries received by the front end interface 102 from users. A search query received by the front end interface 102 from a user includes search criteria such as keywords that identify a video the user is interested in. The video search module 106 uses the search criteria to query the metadata of the video stored in the video database 116. The search results for the query are returned to the front end interface 102 for presentation to the user. For example, if a user provides the front end interface 102 with a keyword search query, the video search module 106 identifies a video stored in the video database 116 related to the keyword and returns the search result (e.g., video IDs and/or metadata such as titles, descriptions, thumbnails of the identified videos) to the front end interface 102.

The upload server 108 receives one or more videos from the content provider 118 via the front end interface 102. For example, the upload server 108 receives one or more of a video file, an audio file (e.g., one or more songs), a file that includes a combination of video and audio, an image file such as a JPEG or GIF file, a file including a video game program and/or a text file from the content provider 118. In one embodiment, the upload server 108 processes the one or more videos to confirm that they include a title sequence, an introduction, a lesson, a recap, and a conclusion and stores the processed videos in the video database 116. For example, a user may view the videos and confirm that the videos include the title sequence, the introduction, the lesson, the recap, and the conclusion. In another example, the upload server 108 includes software that identifies an existence of the parts of the video. For example, the software may identify key words associated with the parts, such as the instructor speaking "introduction," "lesson," "recap," and "conclusion."

The upload server 108 assigns a video ID to the stored video. A video ID may include identifiers for videos ("a video ID"), songs ("a song ID"), images ("an image ID"), video games ("a video game ID"), and tags the videos with topics ("a topic ID"). For example, the upload server 108 assigns a video ID to a video and stores the video together with the video ID in the video database 116. In other embodiments, the upload server 108 performs one or more of: formatting a video; compressing a video; metadata tagging a video; content analysis, etc.

The presentation module 110 is code and routines that, when executed by a processor (not pictured), presents any information intended for a user to a corresponding client device such as the client 120. For example, the presentation module 110 generates a graphic associated with a video and sends the graphic to a web browser (not pictured) installed in the client 120 via the front end interface 102 and the network 105.

The GUI module 126 is code and routines that, when executed by a processor (not pictured), provides graphical data for generating a GUI used by a user to input information. For example, the GUI module 126 generates graphical data for providing a GUI to a publisher 170, allowing a human user operating on the publisher 170 to edit a video. The GUI module 126 is configured to transmit the graphical data to the front end interface 102. In one embodiment, the GUI module 126 stores the graphical data in the graphical database 194. The front end interface 102 communicates with the network 105 to transmit the graphical data to a processor-based computing device communicatively coupled to the network 105. For example, the front end interface 102 transmits the graphical data to the publisher 170. The publisher 170 receives the graphical data and generates a GUI to be displayed on a display device (e.g., a monitor) which is communicatively coupled to the processor-based computing device. The GUI includes one or more fields, drop down boxes or other conventional graphics used by a human user to edit metadata such as the title of the video, a brief description for the video, etc. Data inputted into the GUI is received by the front end interface 102 and stored in the video database 116.

The user database 114 is a storage system that stores data and/or information associated with a user. For example, the user database 114 stores user profiles for users including topics the user provided. In another example, the user database 114 stores the video IDs of videos uploaded by a user to the video hosting site 130 and the video IDs of videos that the user has accessed from the video database 116. In one embodiment, the user is identified by using a login name and password and/or by using the user's internet protocol ("IP") address. The user database 114 also stores information about relationships between users that are generated by the social module 185. For example, the user database 114 may store a social graph that includes the connections between users in the video hosting site 130.

The video database 116 is a storage system that stores videos shared by the video hosting site 130 with the users. In one embodiment, the video database 116 stores the videos processed by the upload server 108. In another embodiment, the video database 116 also stores metadata associated with the videos. The metadata includes one or more of: a title; a description; tag information; a time length; and the like. In one embodiment, some or all of the metadata of the videos is provided by the content provider 118. For example, the content provider 118 provides a title and a description of a video when uploading the video to the video hosting site 130.

The video usage database 192 is a non-transitory computer-readable storage medium that stores usage data of a video, revenue data of a video, and payment data for purchasing a license for a right in a territory for a video. The usage data describes usage of one or more rights for a video. For example, the usage data includes a description of instances in which a right for a video is used, an identifier of a licensor for the right, a territory where the license is applied and an identifier of a service provider that uses the right, etc. The revenue data is data describing revenue generated by monetizing a video. For example, the revenue data includes income generated by associating an advertisement with the video, selling copies of the video or renting the video to users. The payment data is data describing how much a licensor issuing a license for a right associated with a video in a territory is compensated. In one embodiment, the payment data also includes information about an escrow account that a service provider is used to pay the licensor.

The graphical database 194 is a non-transitory computer-readable storage medium that stores graphical data used to provide one or more user interfaces. For example, the graphical database 194 stores graphical data generated by the GUI module 126 for providing a GUI to a publisher 170 to edit a video. The graphical database 194 may store other graphical data generated by the GUI module 126.

The social module 185 is code and routines that, when executed by a processor (not pictured), registers users and generates social connections between users. In some embodiments, the social module 185 can be implemented using hardware including a field-programmable gate array (FPGA) or an application integrated circuit (ASIC). In some other embodiments, the video discovery module 195 can be implemented using a combination of hardware and software. In some embodiments, the social module 185 may be stored in a combination of the devices and servers, or in one of the devices or servers.

In some embodiments, the social module 185 registers users with the video hosting site 130 and generates profiles for the users. The profiles can include topics that the user is interested in. For example, the user can explicitly state that the user wants to see yoga videos, fitness videos, and cooking videos. The profiles can also include usernames, passwords, and billing information (e.g., address, credit card information, etc.).

The social module 185 maintains connections between the users. For example, users can be directly connected in one direction (user A is connected to user B) or two directions (user A is connected to user B and user B is connected to user A). Users can designate the relationship as a friendship, an association, related to a particular topic (e.g. the users are associated in a cooking group), etc. In some embodiments, the social module 185 generates a social graph that includes the connections between users. The social graph can be weighted based on social factors, such as the number of interactions between the users (frequent emailing), a designation of a type of connection (friend, best friend, acquaintance, etc.), etc.

The video discovery module 195 is code and routines that, when executed by a processor (not pictured), discovers and provides videos to users or receives at least one recommendation for a video from the social module 185 and determines whether the second user would be interested in the recommendation. In some embodiments, the video discovery module 195 can be implemented using hardware including a FPGA or an ASIC. In some other embodiments, the video discovery module 195 can be implemented using a combination of hardware and software. In some embodiments, the video discovery module 195 may be stored in a combination of the devices and servers, or in one of the devices or servers.

The video discovery module 195 discovers videos for users in response to a query. When a user enters a topic into a search box, the video discovery module 195 identifies videos that are tagged with the same or similar terms. For example, when a user enters a search for "barefoot running" the video discovery module 195 identifies barefoot running or running videos in the video database 116. In some embodiments, the video discovery module 195 discovers videos for the user based on videos with tags that match topics in the user's profiles. This could occur each time a new video is uploaded to the video hosting site 130, each time a user logs onto the system, each time the user requests to see recommended videos, etc. In yet another embodiment, the video discovery module 195 retrieves the user profile including information about user consumption of vides from the user database 114 and uses the information to discover videos. For example, if the user has been watching a lot of videos recently about making baby food, the video discovery module 195 identifies videos about baby food regardless of whether this is a specific topic associated with the user profile. In some embodiments, the video discovery module 195 applies a score to the different topics and ranks the videos based on the user's interest in the different topics.

In some embodiments, the video discovery module 195 receives a recommendation about a recommended video from a second user that is connected to the first user. The video discovery module 195 determines whether the first user will be interested in the recommended video based on the topics and user consumption. For example, if the second user recommends a video about mixed martial arts and the first user has only expressed interest in cooking videos, the video discovery module 195 does not provide the first user with the recommendation. In some embodiments, the video discovery module 195 scores the topic associated with the recommended video and ranks the recommended video based on the score. This is advantageous for trying to encourage users to continue using the service because some users might be so annoyed by getting recommendations for videos that the user might discontinue using the service.

If the video discovery module 195 determines that the first user would not be interested in the video, the video discovery module 195 does not notify the first user of the recommendation for the recommended video. In some embodiments, the video discovery module 195 stores the recommendation in a repository accessible by the first user. The video discovery module 195 may instruct the GUI module 126 to generate a section in the user interface where the user can find the recommended videos without receiving a notification. This way the user can be aware of the video, but not be annoyed with notifications to watch it.

In some embodiments, the video discovery module 195 determines a reaction of the user to the recommended video and modifies the algorithm for determining whether the user would be interested in the video accordingly. The video discovery module 195 may update the user profile based on the reaction of the first user to the recommended video. Continuing with the example above, if the first user has only expressed an interest in cooking videos, but the user reacts positively to the recommended video about mixed martial arts, the video discovery module 195 updates the user profile to include mixed martial arts as a topic of interest and updates the user consumption to include the recommended video as a video that the user watched and the positive reaction associated with the video.

The chat module 197 is code and routines that, when executed by a processor (not pictured), determines which instructional videos should be associated with a chat room and generates the chat room at predetermined times. In some embodiments, the chat module 197 can be implemented using hardware including a FPGA or an ASIC. In some other embodiments, the chat module 197 can be implemented using a combination of hardware and software. In some embodiments, the video discovery module 195 may be stored in a combination of the devices and servers, or in one of the devices or servers.

The chat module 197 identifies an instructional video from a group of instructional videos for associating with a chat room. For example, the chat module 197 determines which users are active on the video hosting site and identifies activities associated with the users that indicate which videos might benefit from having a chat room. For example, if particular categories are included in currently active users' profiles, the chat module 197 identifies instructional videos associated with those categories. In another example, the chat module 197 identifies categories associated with historical behavior of active users. Active users may include users that have watched videos. Active users may also include users that have participated in chats. In some embodiments, the chat module 197 ranks different activities associated with an active user. For example, participating in a chat is more indicative of an interested user than simply viewing a video.

Once the chat module 197 receives a selection of the instructional video from the user, the chat module 197 generates a chat room for the user to discuss the instructional video a predetermined amount of time before the instructional video begins. For example, the chat room is available 15 minutes before the instructional video begins. Once the video serving module 104 finishes streaming the instructional video to the user, the chat module 197 provides the chat room for the user to discuss the instructional video a predetermined amount of time after the instructional video ends. The predetermined amount of time the chat room is available before and after the instructional video is streamed may be the same or different.

In some embodiments, the instructor participates in the chat. This can help users experience personalized instructions and the real-time interaction can be more valuable for teaching the user than when the instructor answers questions in a comment section appended to the video.

Filming Examples

Figure 2A:
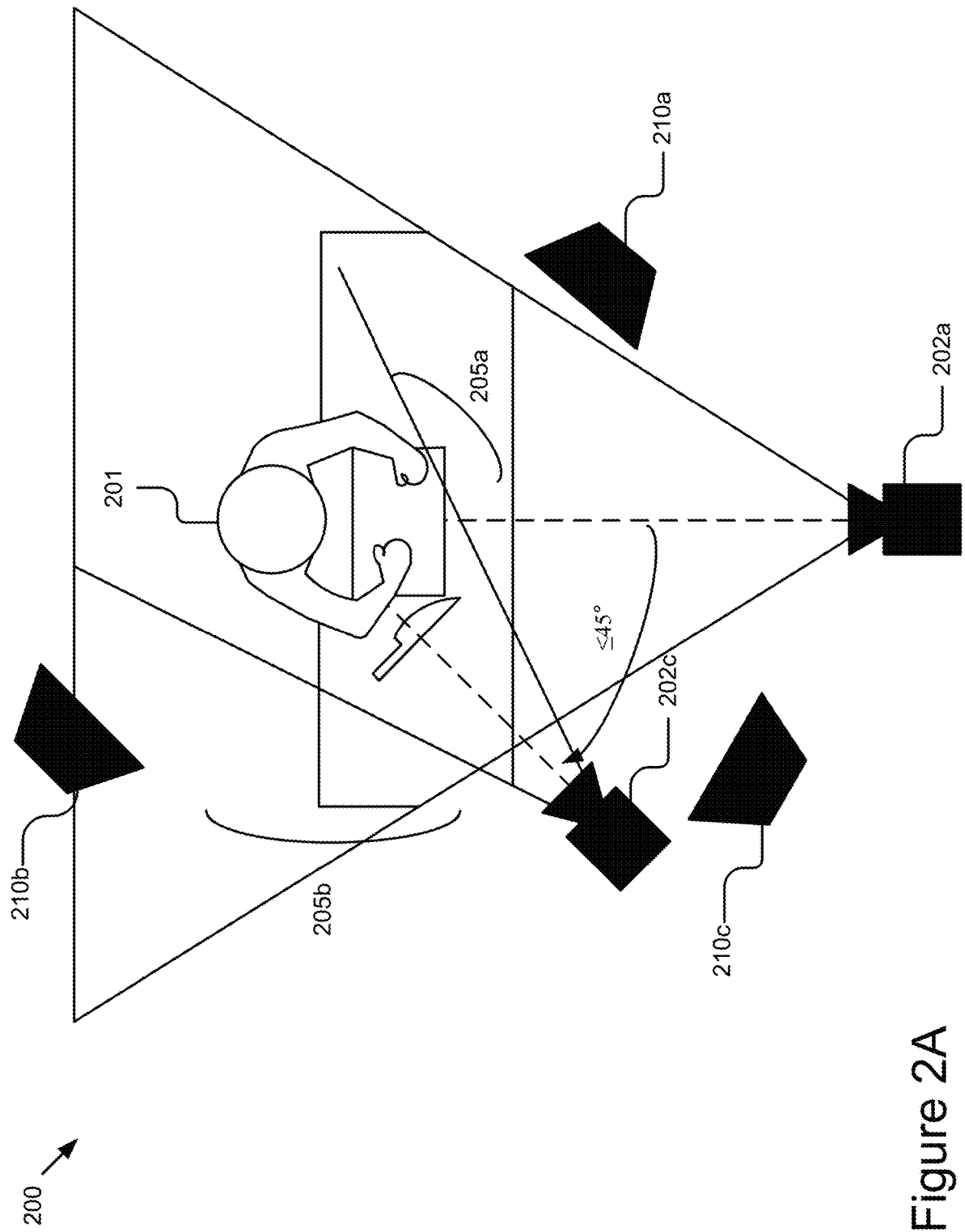
FIG. 2A illustrates an example diagram for filming an event at eye level.

FIG. 2A illustrates an example diagram 200 for filming an event at eye level. In this example, the instructor 201 is demonstrating a cooking technique as evidenced by the knife and the chopping board where the instructor 201 is manipulating food items. A first recording device 202a captures images at an eye level of the instructor 201. A second recording device 202b captures close-up shots to illustrate a concept being taught during the event.

The instructional video is shot in a studio with a front area and a back area. The instructional video is filmed from two different angles to obtain wide shots and detail shots. The wide shots captured by the first recording device 202a may be locked-down, straight-on wide shots that provide basic coverage of the event and the focus is on the instructor when the instructor speaks. The wide-shots may be captured by a static camera with a 14-35 mm lens. The event is captured at eye level to create a sense of connection between an audience viewing the video and the instructor. The audio may have a peak volume of −6 dB. A field of focus 205a captured by the first recording device 202a may be lit primarily by a key light 210a. The field of focus 205 may also be backlight by a back light 210b (also known as a rim light) and filled in with a fill light 210c. The key light 210a and the fill light 210c may be located in the front area of the studio. The back light 210b may be located in the back area of the studio.

The detail shots may be captured by a second recording device 202b. For example, the second recording device 202b may be a camera with a variable zoom on a fluid head with a 40-80 mm lens. The detail shots may include subtle body movements, nuanced techniques, etc. The detail shots may be within 45 degrees of the wide shots. In the example illustrated in FIG. 2A, the detail shots may include close-ups of the instructor 201 chopping vegetables with a knife. The detail shots may be illuminated by a key light 210a, a back light 210b, and a fill light 210c.

The videos include a title sequence, an introduction, a lesson, a recap, and a conclusion. The title sequence may be specified by a producer associated with a video hosting site 130. The introduction is when users decide whether to continue to watch the video. As a result, the instructor should make eye contact to engage the users. The introduction may be filmed separate from the first video stream and the second video stream to ensure that the introduction is correctly filmed. The introduction may be filmed as medium shots (also known as tight shots). The introduction may be about 25 seconds, include a hook to interest users in the video, and may be devoid of any filler language, such as ums or pauses. The introduction may include the following script: "Hi my name is [name], we're talking about [video series title], today's lesson is on [lesson title], let's get started." Depending on the subject of the video, the introduction may include a finished product, key poses, etc. The lesson may include a step-by-step lesson designed by experts and category managers. The recap includes a summary of what was demonstrated and the video stream of the recap includes a straight-on shot of the instructor. The conclusion may include the following script: "I'm [expert] and it's been great sharing with you how to [x]. Thanks for watching. Let me know what you thought in the comments." The instructor may hold a smile for several seconds after the words in the script are spoken.

The videos may be lighted to ensure that the details are visible. For example, the video streams may be shot with a three-point light setup. One light may be on either side of a frame of the shot, at 45-degree angles pointed at the expert, and one back/rim-light behind pointed at the instructor. The light pointed at the instructor may include a field of focus for the user. The lights may include diffusers instead of honeycombs to create a softer light on the instructor's face. In instances where an instructor has more pronounced facial features, extra lighting may be used in the middle of the shots by placing extra lighting on the ground.

Figure 2B:
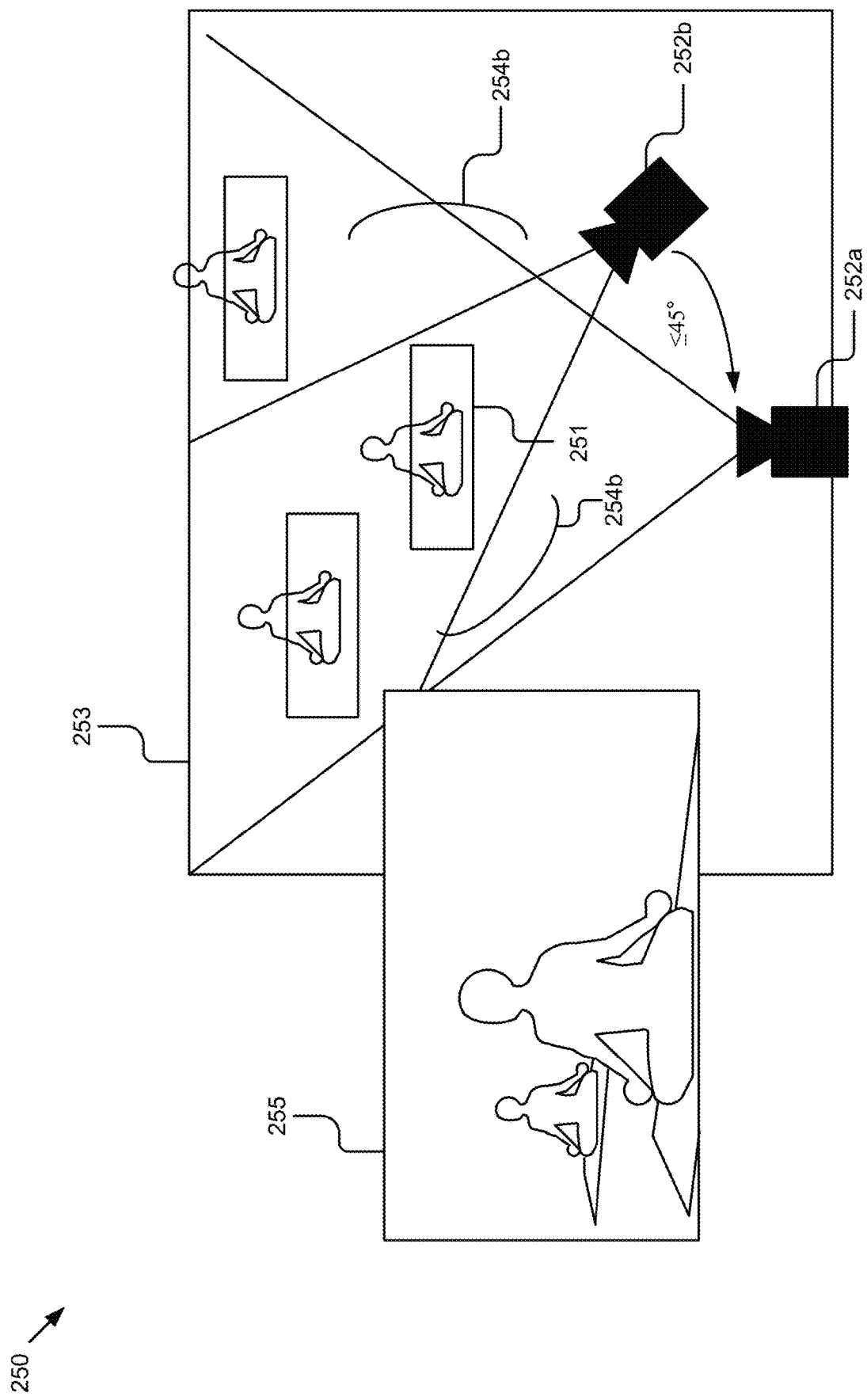
FIG. 2B illustrates an example diagram for filming the instructor and other participants.

FIG. 2B illustrates an example diagram 250 for filming the instructor 251 and other participants. In this example, the event is an instructional video for yoga filmed with the instructor 251 and two participants. The main panel 253 includes a top view of a yoga studio that is captured by a first recording device 252a and a second recording device 252b. The recording devices 252 capture two fields of focus 254a, 254b. During the filming, the participants should not draw attention away from the instructor 251. Specifically, the first recording device 252a should be able to capture an unobstructed view of the instructor where the participants are positioned on each side of the instructor.

The wide shot captures all three people. The detail shot captures primarily the instructor to ensure that sufficient details are visible when the instructor is detailing certain techniques. The detail shot is illustrated in more detail in 255. The detail shot 255 may include nuanced movement and techniques that the wide shot does not capture.

Figure 2C:
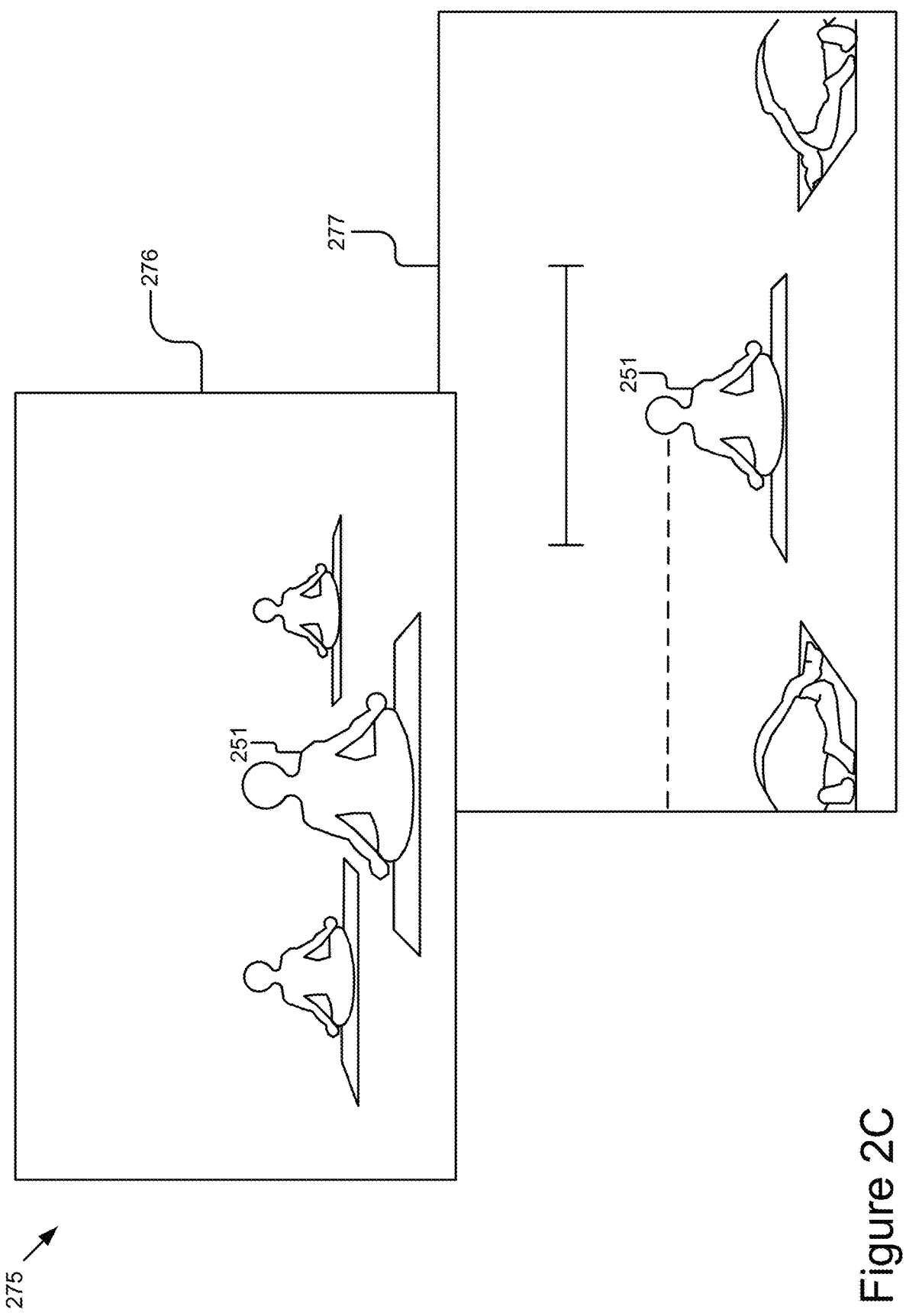
FIG. 2C illustrates another example diagram for filming the instructor and other participants of FIG. 2B.

FIG. 2C illustrates another example diagram 275 for filming the instructor 251 and other participants of FIG. 2B. Frame 276 illustrates a studio that is large enough to capture all of the instructor 251 and the two participants. Frame 277 illustrates a smaller studio where it may not be possible to capture all of the participants. In instances where the studio is too small to capture all of the instructor 251 and the participants, the images of the instructor should include a video clearance where all of the instructor is visible when the instructor stands with arms raised and images at the instructor's 251 eye level should be captured.

Example Graphical User Interfaces

FIG. 3A illustrates an example user interface 300 for selecting an instructional video. This example is configured for display on a mobile device, but persons of ordinary skill in the art will recognize that other configurations are possible, such as a display for a desktop computer that is longer horizontally than vertically. In this example, the classes are divided according to times, time zones, and dates. The user can enroll in a class by clicking on the link associated with the timezone.

Figure 3B:
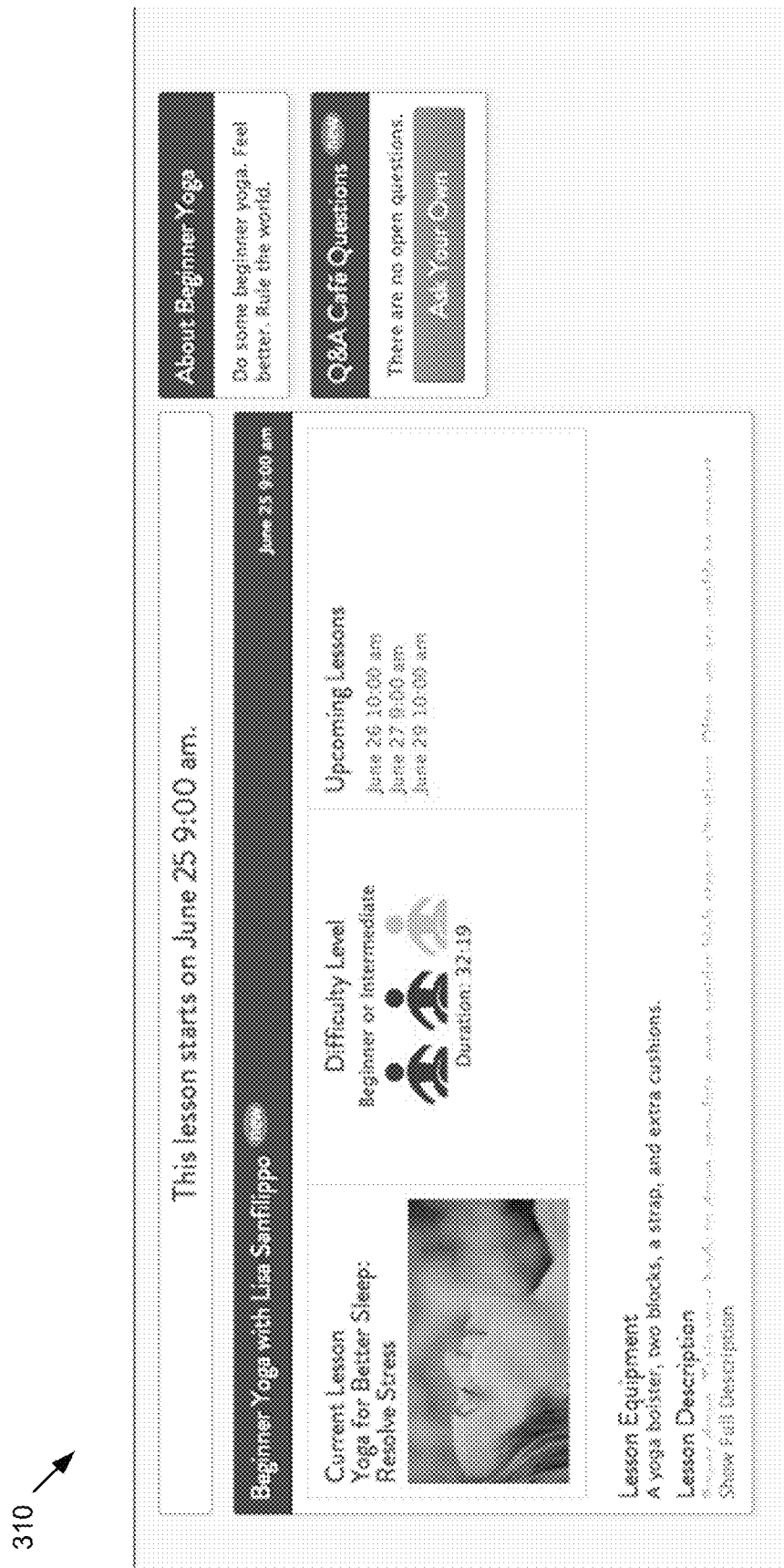
FIG. 3B illustrates an example user interface for viewing information about a group instructional video.

FIG. 3B illustrates an example user interface 310 for viewing information about an instructional video. The instructional video is displayed with information about the class. The user interface also includes a question and answer section where the instructor can answer questions about the instructional video.

Figure 3C:
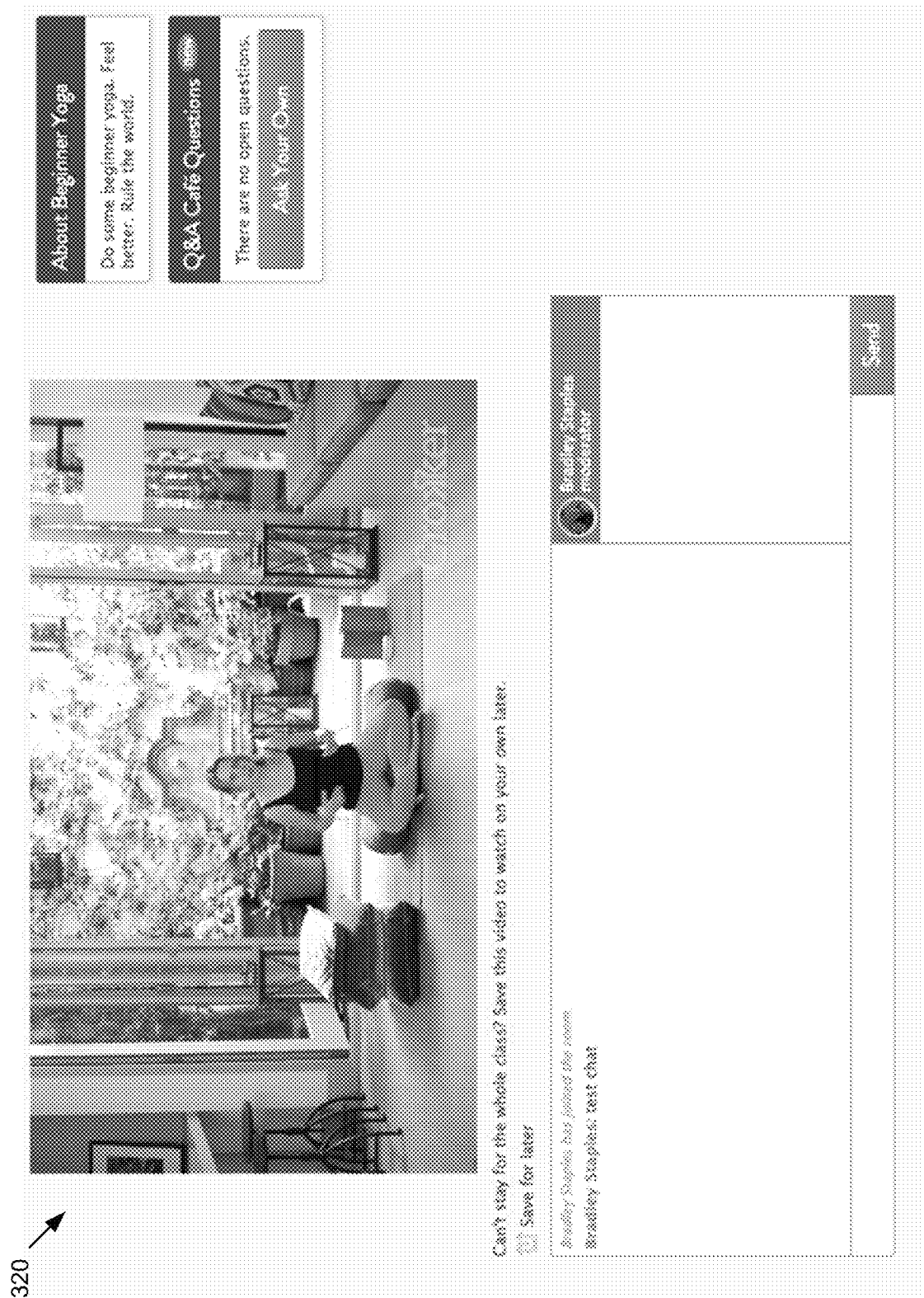
FIG. 3C illustrates an example user interface of a chat room before the start of the group instructional video.

FIG. 3C illustrates an example user interface 320 of a chat room before the start of the instructional video. The chat room is displayed below the video. The list of participants are included in the right-hand column and the text box for entering text is below the chat room. Other configurations are possible. Displaying the chat room before the instructional video begins can be helpful for asking about equipment needed, what to expect, etc.

Figure 3D:
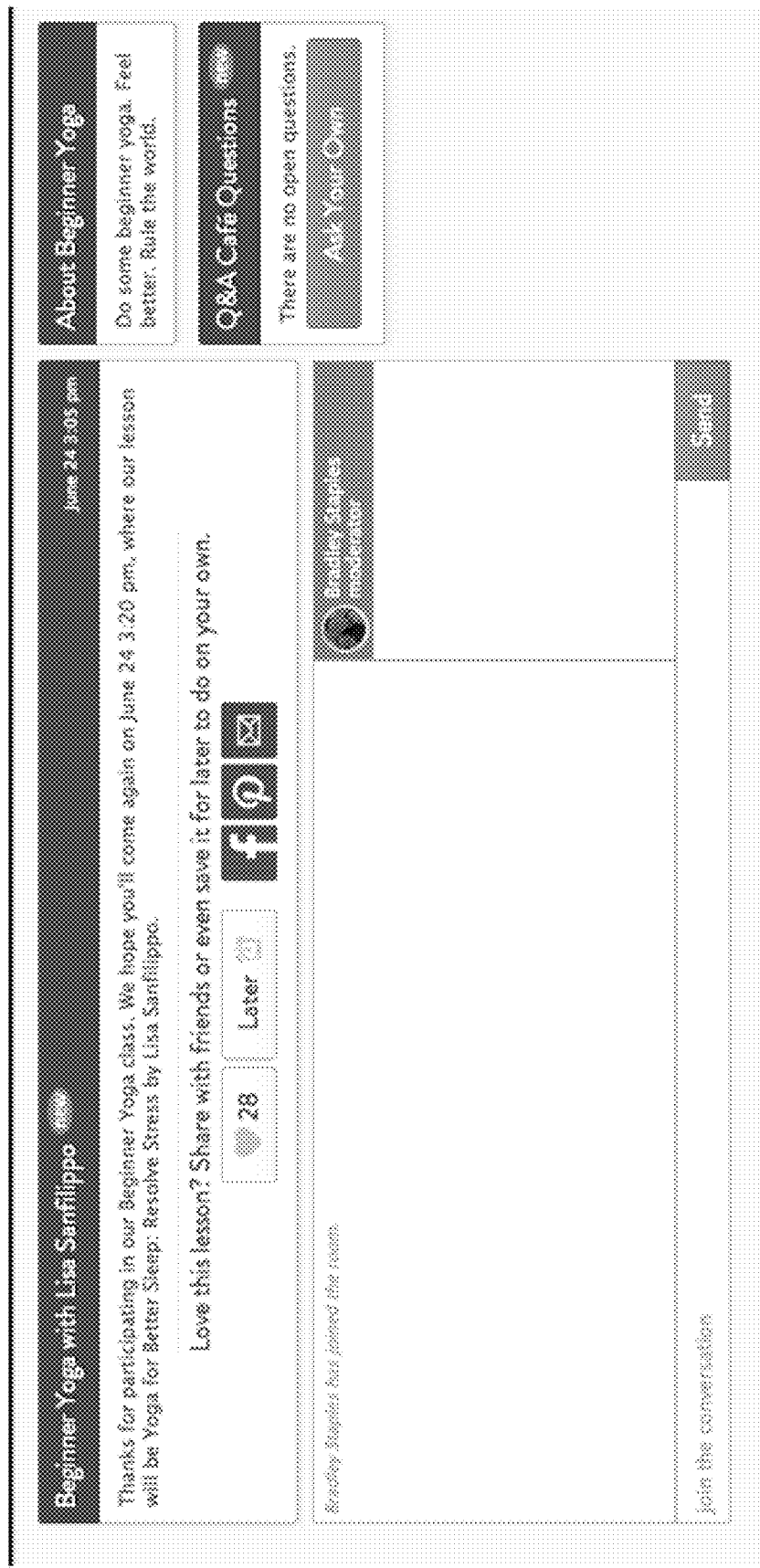
FIG. 3D illustrates an example user interface of a chat room after the group instructional video is streamed.

FIG. 3D illustrates an example user interface 330 of a chat room after the instructional video is streamed. Displaying the chat room after the instructional video ends can be helpful for asking clarifying questions about things that happened during the streaming of the instructional video.

Figure 3E:
FIG. 3E illustrates an example user interface of an expired group instructional video.

FIG. 3E illustrates an example user interface 340 of an expired instructional video. In this example, the time of expiration is displayed. In some embodiments, the user interface could include a link to a log of the chat room associated with the instructional video.

Example Methods

Figure 4:
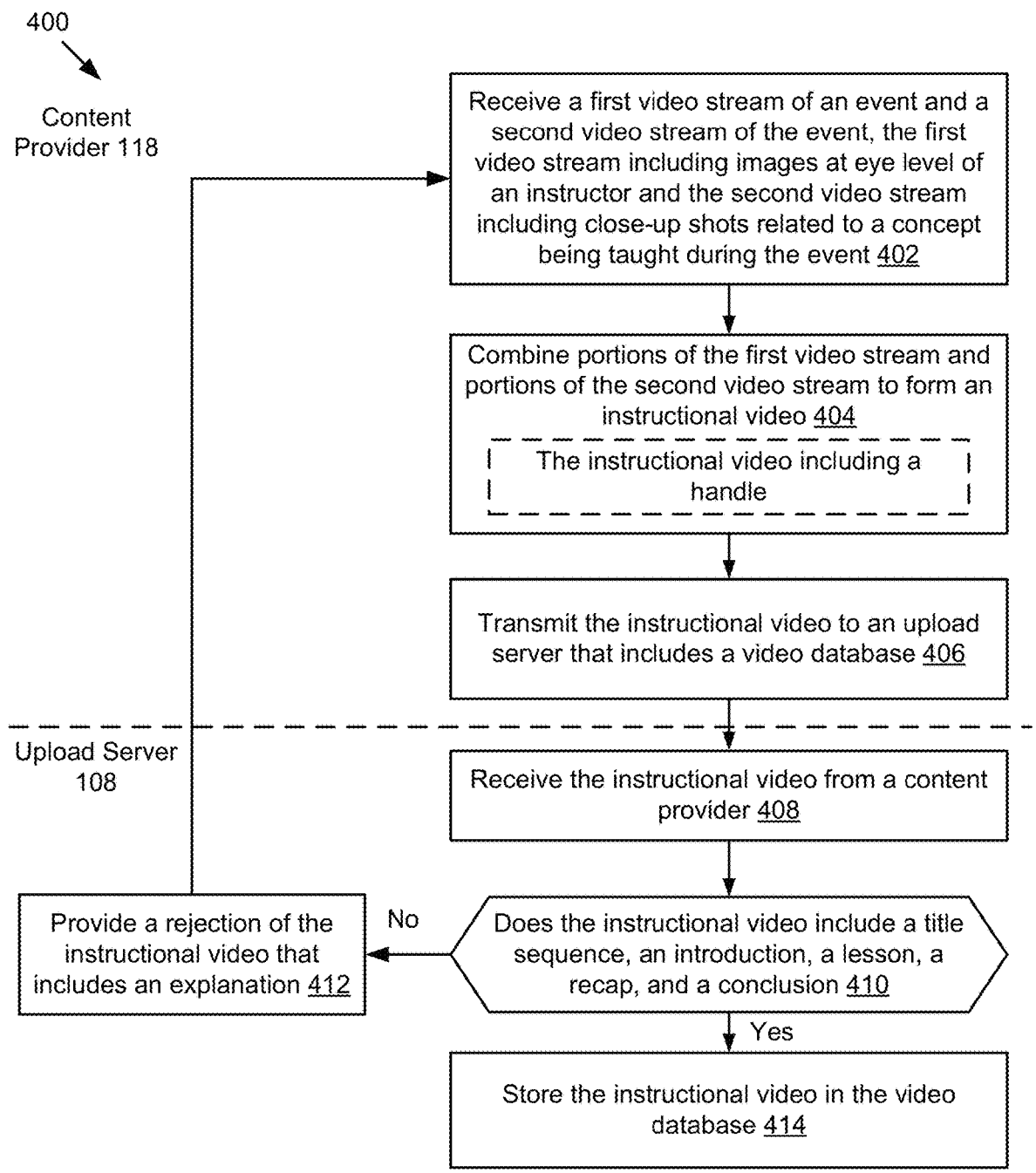
FIG. 4 illustrates an example flow chart for determining whether to store an instructional video in a video database.

FIG. 4 illustrates an example flow chart 400 for generating and uploading a video. This example includes both steps performed by the content provider 118 and the upload server 108. The content provider 118 receives 402 a first video stream of an event and a second video stream of the event, the first video stream including images at eye level of an instructor and the second video stream including images of close-up shots related to a concept being taught during the event. For example, the video streams are for how to use free weights. The content provider 118 combines 404 portions of the first video stream and portions of the second video stream to form an instructional video. For example, the first video stream is used for the majority of the instructional video and portions of the second video stream are spliced in to provide additional directions for complicated techniques. The content provider 118 may add a handle at the end of the instructional video. For example, the handle may be one second. The content provider 118 transmits 406 the instructional video to an upload server 108 that includes a video database 116.

The upload server 108 receives 408 the instructional video from the content provider 118 and determines 410 whether the instructional video includes a title sequence, an introduction, a lesson, a recap, and a conclusion. If the instructional video is missing any of these components, the content provider 118 provides 412 a rejection of the instructional video that includes an explanation. The content provider 118 may repeat any of steps 402-408 until the instructional video is accepted. If the instructional video includes the components, the upload server 108 stores 414 the instructional video in the video database 116.

Figure 5:
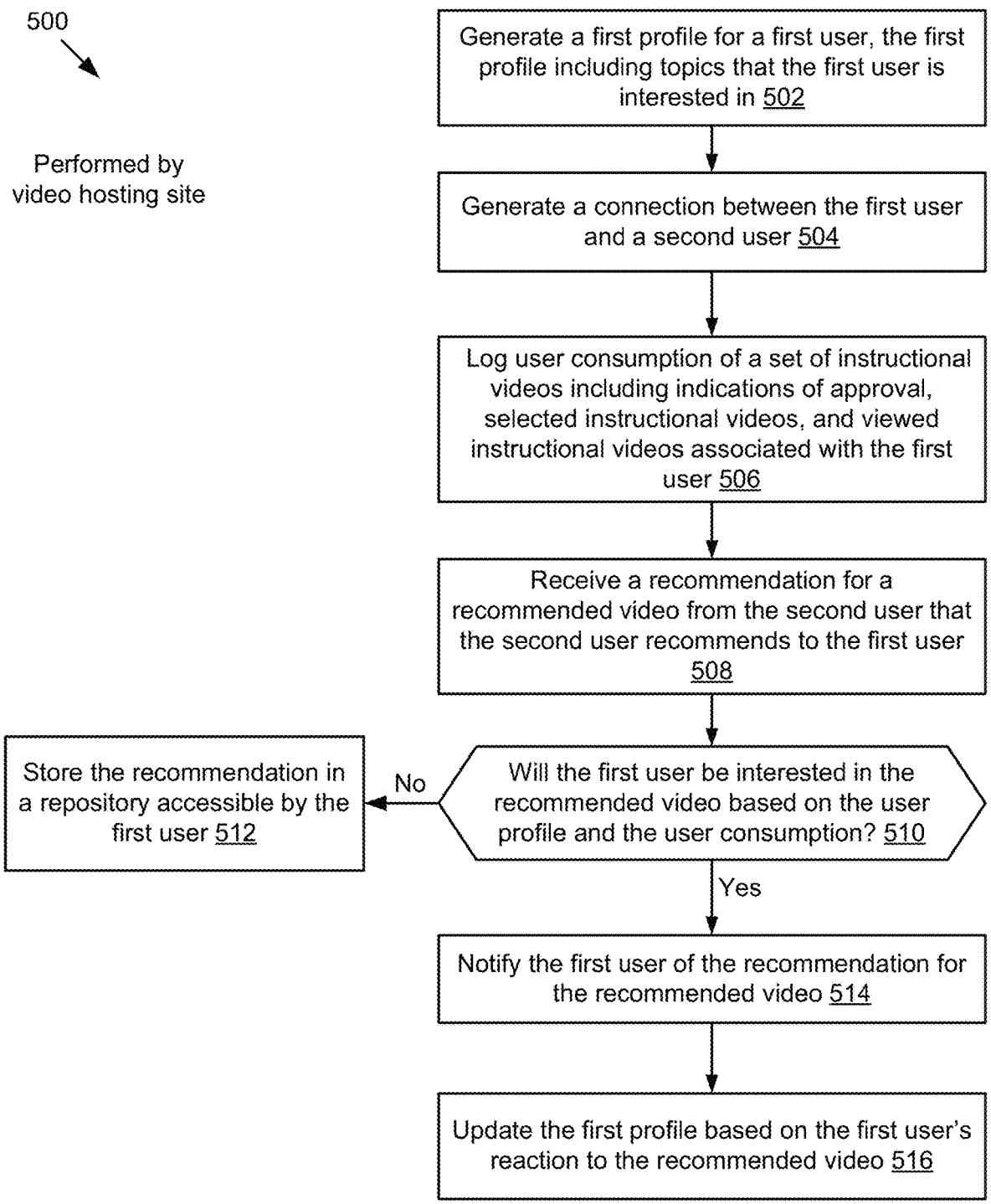
FIG. 5 illustrates an example flow chart for determining whether to provide a recommended video to a user.

FIG. 5 illustrates an example flow chart 500 for determining whether to provide a recommended video to a user. The social module 185 generates 502 a first profile for a first user, the first profile including topics that the first user is interested in. For example, the first user explicitly states that she's interested in career advancement videos and construction videos. The social module 185 generates 504 a connection between the first user and a second user. For example, the first user follows the second user. The video discovery module 195 logs 506 user consumption of a set of videos including indications of approval, selected videos, and viewed videos associated with the first user. Indications of approval include, for example, likes, thumbs up, +1, etc. Selected videos could be videos that are selected for a collection, videos for later viewing, etc.

The video discovery module 195 receives 508 a recommendation for a recommended video from the second user for the first user. For example, the second user sends a recommended video about how to make a space alien costume. The video discovery module 195 determines 510 whether the first user will be interested in the recommended video based on the user profile and user consumption. For example, if the first user has not provided space aliens as a topic, but the first user has watched a few videos about how to make space alien cake. If it is determined that the first user will not be interested in the recommended video, the video discovery module 195 stores 512 the recommendation in a repository accessible by the first user. If it is determined that the first user will not be interested in the recommended video, the video discovery module 195 may notify 514 the first user of the recommendation for the recommended video. The video discovery module 195 updates 516 the user consumption based on the first user's reaction to the recommended video. For example, if the first user likes the video, the video discovery module 195 can score space aliens as being a topic of interest for the first user.

Figure 6:
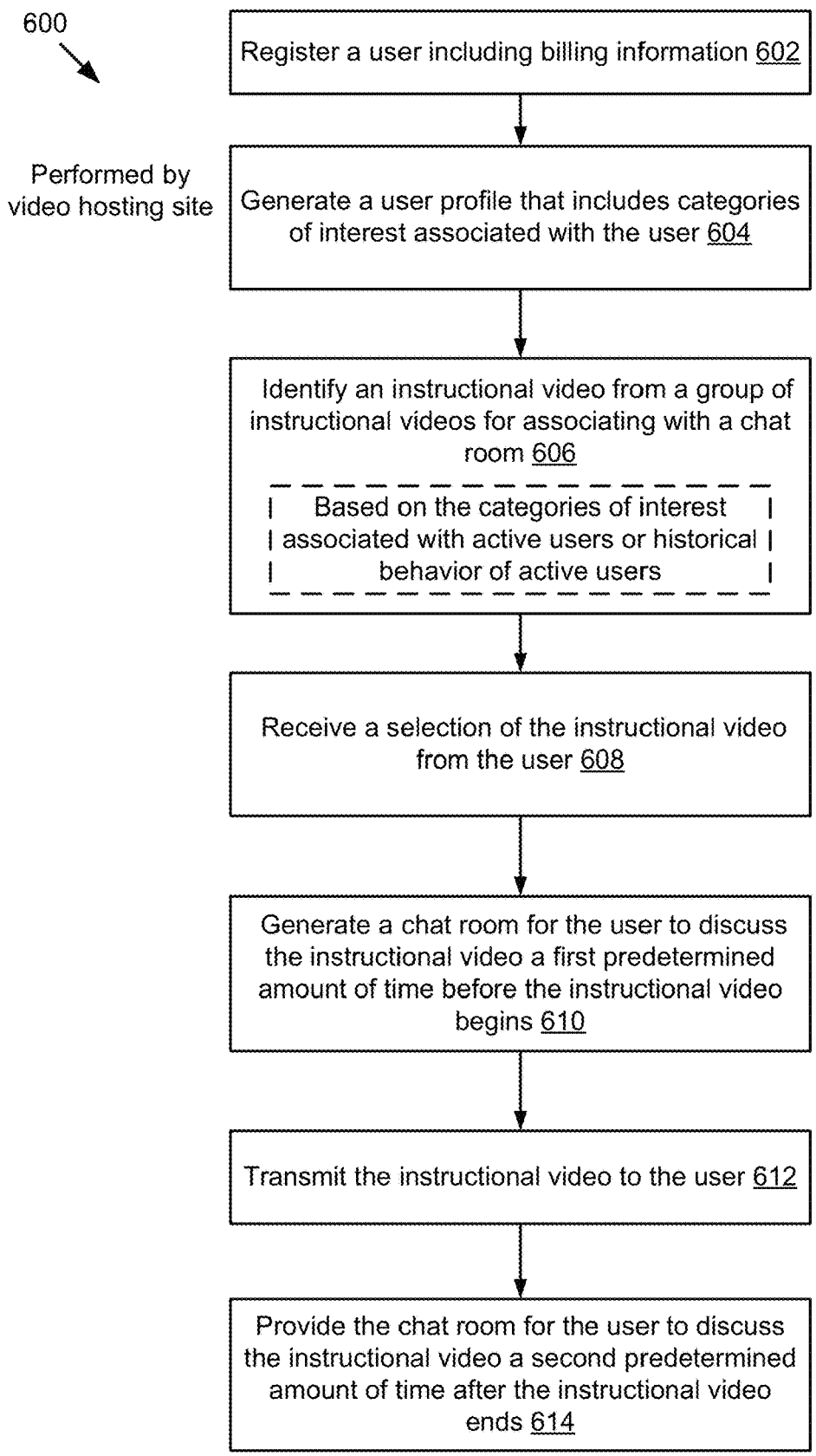
FIG. 6 illustrates an example flow chart for generating an instructional video and chat room.

FIG. 6 illustrates an example flow chart of a method 600 for generating a chat room associated with an instructional video. In some embodiments, a video hosting site 130 includes a video serving module 104, a payment system 190, a social module 185, and a chat module 197 for performing the method steps. The payment system 190 registers 602 a user including billing information. The social module 185 generates 604 a user profile that includes categories of interest associated with a user. For example, the category includes cooking. The chat module 197 identifies 606 an instructional video from a group of instructional videos for associating with a chat room. In some embodiments, the identity is based on the categories associated with active users or historical behavior of active users. The chat module 197 receives 606 a selection of the instructional video from the user and generates 608 a chat room for the user to discuss the instructional video a first predetermined amount of time before the instructional video begins. The video serving module 104 transmits 610 the instructional video to the user. The chat module 197 provides 612 the chat room for the user to discuss the instructional video a second predetermined amount of time after the instructional video ends.

Figure 7:
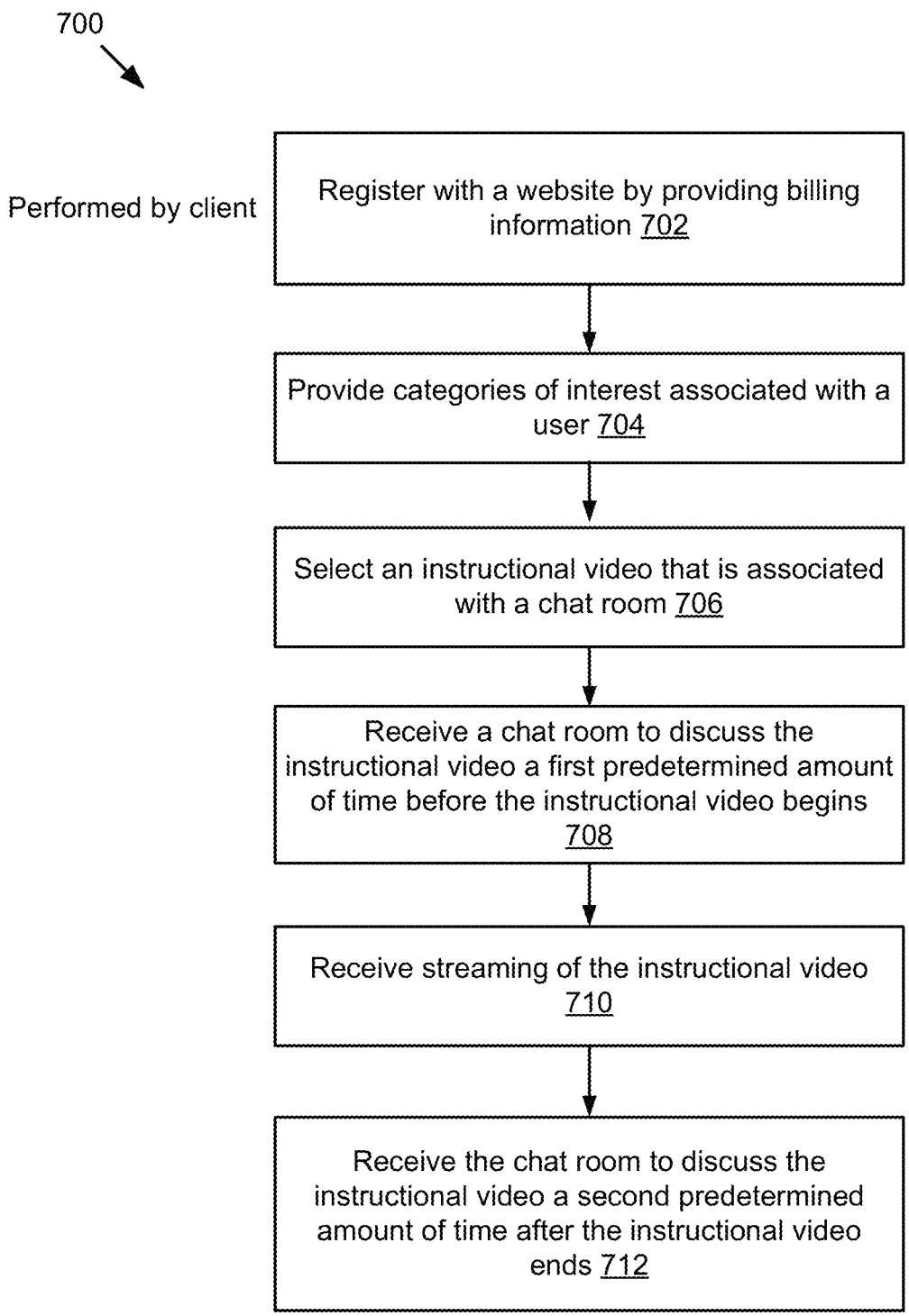
FIG. 7 illustrates an example flow chart for accessing a chat room.

FIG. 7 illustrates an example flow chart of a method 700 for accessing a chat room with a client 120. The client 120 registers 702 with a website by providing billing information. The client 120 provides 704 categories of interest associated with a user. In some embodiments, the client 120 performs activities indicative of having categories of interest, for example, when the user watches instructional videos, provides indications of approval, or adds instructional videos to a collection. The client 120 selects 706 an instructional video that is associated with a chat room and receives 708 a chat room to discuss the instructional video a first predetermined amount of time before the instructional video begins. In some embodiments, the instructor is present in the chat room to interact with the users. The client 120 receives 710 streaming of the instructional video. The client 120 also receives 712 the chat room to discuss the instructional video a second predetermined amount of time after the instructional video ends. The first and second predetermined amount of times may be different or the same.

In the description, for purposes of explanation, numerous specific details are set forth in order to provide a thorough understanding of the specification. It will be apparent, however, that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used to most effectively convey the substance of their work. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code for providing rights clearance for granular rights will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

The description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. The examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the specification is in no way limited to implementation in any specific programming language, or for any specific operating system or environment. Accordingly, the disclosure is intended to be illustrative, but not limiting, of the scope of the specification.

What is claimed is:

1. A computer-implemented method for analyzing an instructional video comprising:

registering a group of users including respective billing information of the group of users;

generating user profiles for each user in the group of users;

identifying the instructional video from a group of instructional videos for associating with a chat room;

providing a user interface to a first user from the group of users, the user interface including information about the instructional video;

receiving a selection of the instructional video from the first user via the user interface;

updating the user interface to include the chat room for the first user to discuss the instructional video with other users from the group of users a first predetermined amount of time before the instructional video begins streaming; and streaming the instructional video to the first user at a specific time.

2. The method of claim 1, wherein the information about the instructional video includes a start time, a difficulty level, a duration, and lesson equipment that will be used in the instructional video.

3. The method of claim 1, further comprising:
providing the first user with a schedule of upcoming classes.

4. The method of claim 1, wherein the chat room includes information about a subsequent instructional video.

5. The method of claim 1, further comprising:
determining that the first user will be interested in the instructional video; and
providing a notification to the first user that includes a recommendation for the instructional video.

6. The method of claim 5, further comprising:
determining a reaction of the first user after the first user views the instructional video; and
modifying an algorithm for determining whether the first user would be interested in a subsequent video based on the reaction of the first user.

7. The method of claim 1, wherein the group of users are associated with videos related to a particular topic.

8. The method of claim 1, further comprising:
generating a social graph that includes connections between each user in the group of users, wherein the social graph is weighted based on social factors that include at least one of a number of interactions between each user in the group and a type of connection between each user in the group.

9. The method of claim 1, wherein the user interface includes a question and answer section where the first user can ask a question and an instructor can answer the question.

10. A system comprising:
one or more processors; and
a memory with instructions stored thereon that, when executed by the one or more processors, cause the one or more processors to perform operations comprising:
registering a group of users including respective billing information of the group of users;
generating user profiles for each user in the group of users;
identifying an instructional video from a group of instructional videos for associating with a chat room;
providing a first user from the group of users with a user interface that includes information about the instructional video;
receiving a selection of the instructional video from the first user via the user interface;
updating the user interface to include the chat room for the first user to discuss the instructional video with other users from the group of users a first predetermined amount of time before the instructional video begins streaming; and
streaming the instructional video to the first user at a specific time.

11. The system of claim 10, wherein the information about the instructional video includes a start time, a difficulty level, a duration, and lesson equipment that will be used in the instructional video.

12. The system of claim 10, wherein the instructions cause the one or more processors to perform additional operations comprising:
providing the first user with a schedule of upcoming classes.

13. The system of claim 10, wherein the chat room includes information about a subsequent instructional video.

14. The system of claim 10, wherein the instructions cause the one or more processors to perform additional operations comprising:
determining that the first user will be interested in the instructional video; and
providing a notification to the first user that includes a recommendation for the instructional video.

15. A non-transitory computer readable medium with instructions that, when executed by one or more computers, cause the one or more computers to perform operations, the operations comprising:
registering a group of users including respective billing information of the group of users;
generating user profiles for each user in the group of users;
identifying an instructional video from a group of instructional videos for associating with a chat room;
providing a first user from the group of users with a user interface that includes information about the instructional video;
receiving a selection of the instructional video from the first user via the user interface;
updating the user interface to include the chat room for the first user to discuss the instructional video with other users from the group of users a first predetermined amount of time before the instructional video begins streaming; and
streaming the instructional video to the first user at a specific time.

16. The computer readable medium of claim 15, wherein the information about the instructional video includes a start time, a difficulty level, a duration, and lesson equipment that will be used in the instructional video.

17. The computer readable medium of claim 15, wherein the operations further comprise:
providing the first user with a schedule of upcoming classes.

18. The computer readable medium of claim 15, wherein the chat room includes information about a subsequent instructional video.

19. The computer readable medium of claim 15, wherein the operations further comprise:
determining that the first user will be interested in the instructional video; and
providing a notification to the first user that includes a recommendation for the instructional video.

20. The computer readable medium of claim 19, wherein the operations further comprise:

determining a reaction of the first user after the first user views the instructional video; and modifying an algorithm for determining whether the first user would be interested in a subsequent video based on the reaction of the first user.

* * * * *